3 Sheets--Sheet 1.
WILLIAM G. CROSSLEY.
Improvement in Wheel-Plows.
No. 4,928. Fig. 1. Reissued June 4, 1872.
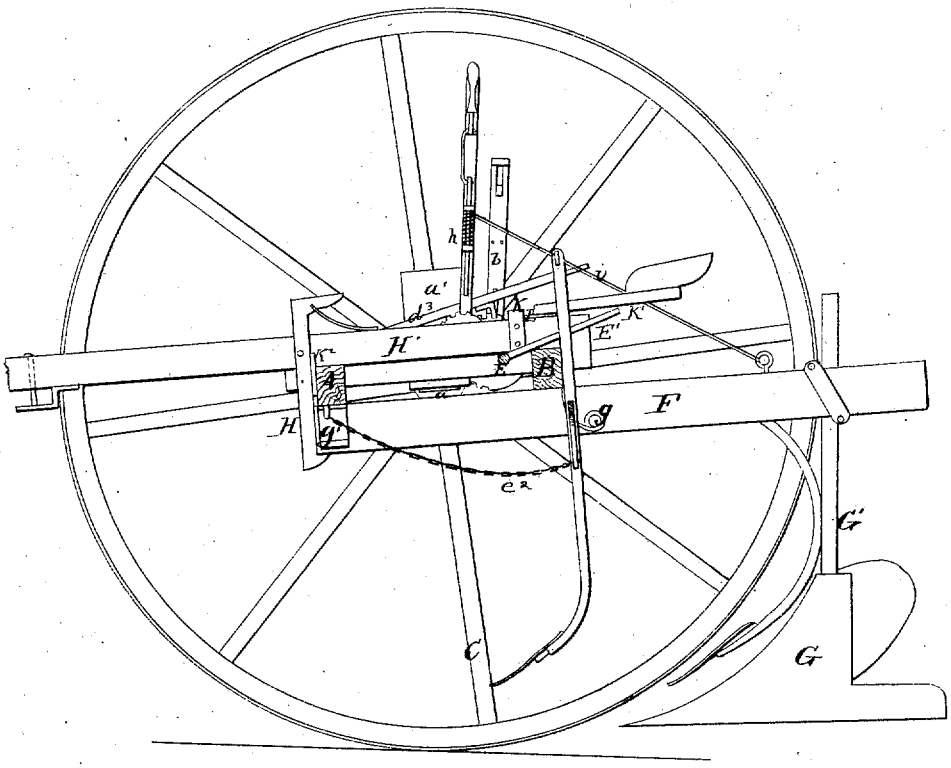
Fig. 2.
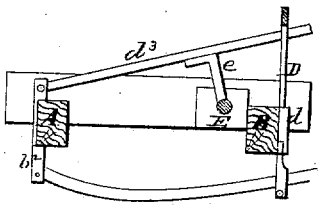
WITNESSES.
George Elphan.
P. D. Kane
INVENTOR.
William G. Crossley
Chipman Hosmer & Co
Attys
AM. PHOTO-LITHOGRAPHIC CO. N.Y. (OSBORNE'S PROCESS.)

3 Sheets--Sheet 2.

WILLIAM G. CROSSLEY.

Improvement in Wheel-Plows.

No. 4,928. Reissued June 4, 1872.

WITNESSES.
George E. Hoffman.
D. D. Kane

INVENTOR.
William G. Crossley
Chipman & Osmis & Co
Attys.

AM. PHOTO-LITHOGRAPHIC CO. N.Y. (OSBORNE'S PROCESS.)

3 Sheets--Sheet 3.

WILLIAM G. CROSSLEY.

Improvement in Wheel-Plows.

No. 4,928. Reissued June 4, 1872.

WITNESSES.
E. A. Bates
Geo. E. Upham,

INVENTOR.
William G. Crossley
Chipman & Hosmer
Attorneys

A.M. PHOTO-LITHOGRAPHIC CO. N.Y. (OSBORNE'S PROCESS.)

UNITED STATES PATENT OFFICE.

WILLIAM G. CROSSLEY, OF APPLE RIVER, ILLINOIS, ASSIGNOR TO BLACK, IRVINE & CO.

IMPROVEMENT IN WHEEL-PLOWS.

Specification forming part of Letters Patent No. 72,981, dated January 7, 1868; reissue No. 4,928, dated June 4, 1872.

*To all whom it may concern:*

Be it known that I, WILLIAM G. CROSSLEY, of Apple River, in the county of Jo Daviess and State of Illinois, have invented a new and valuable Improvement in Sulky-Plows and Cultivators; and I do hereby declare that the following is a full, clear, and exact description of the construction and operation of the same, reference being had to the annexed drawing making a part of this specification, and to the letters and figures marked thereon.

Figure 3:
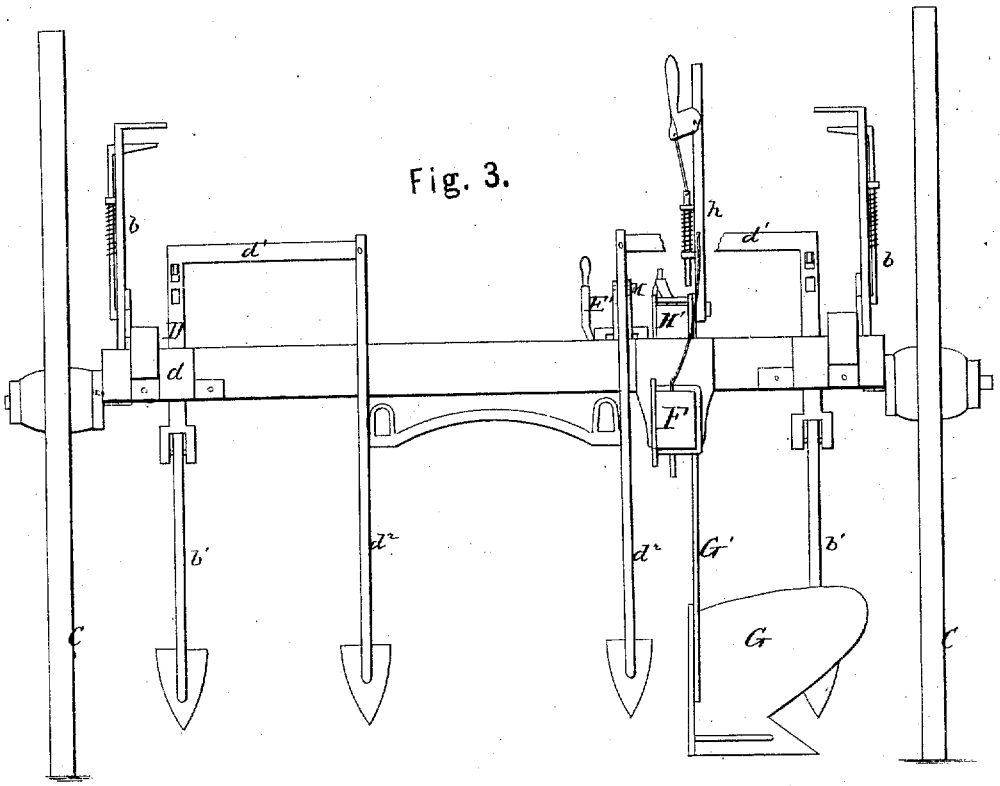
Figure 4:
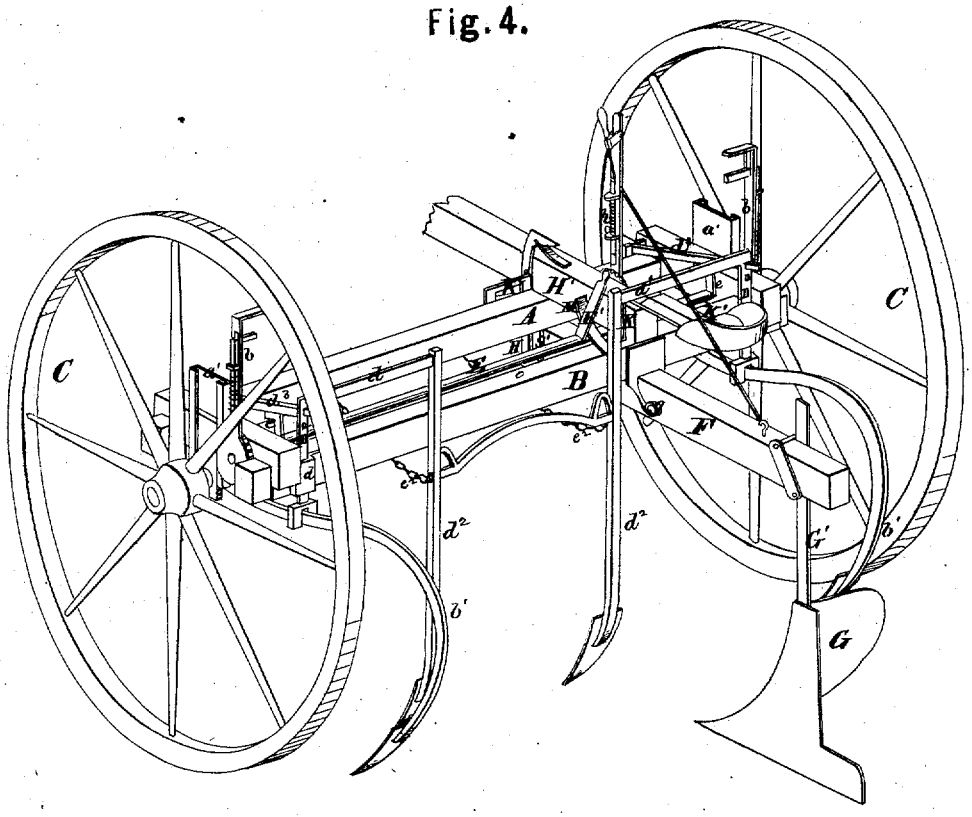

Figure 1 of the drawing is a vertical sectional view of an implement embodying my improvements. Fig. 2 is a detail view. Fig. 3 is rear view; and Fig. 4 is a perspective view of the same.

My invention has relation to a combined sulky-plow and cultivator, and consists of the following elements, to wit: First, attaching the plow-beam to the sulky frame or axle in such a manner that the weight shall be supported by said frame or axle and the sulky-wheels. The object of this arrangement is to prevent the plow from "dragging," and thereby lessen the draft or strain. The second element of my invention consists in attaching the plow-beam to the back of the sulky-frame by means of a hinge, and to the front of the frame by means of a spring-catch, in order that the plow may be raised from the ground by depressing the forward end of the beam, suitable devices being used for the purpose of raising and holding the plow in position. The third element of my invention consists in the construction and novel arrangement of devices which appertain to the raising and lowering of the cultivator-shovels, as hereinafter described.

In the drawing, A B represent the front and rear bars of a rectangular sulky-frame, which is supported upon wheels C. The spindles project from vertically-adjustable rack-plates *a*, arranged between flanges formed on plates *a'*, attached to the ends of the sulky-frame midway between the bars A and B. The plates *a* are operated by means of devices shown at *b*, and are adjustable in order to regulate the depth of furrow. The shanks $b^1$ of the outer cultivator-shovels are hinged to plates $b^2$ depending from the bar A, and pass through loops on the lower ends of arms D, which slide through boxes *d* secured to the bar B. The arms D have attached to their upper ends horizontal bars $d^1$, connected to the inner shovel-shanks $d^2$. $d^3$ designates rods hinged to the upper part of the plates $b^2$, and passing through openings in the upper part of arms D. E represents a rod journaled to the ends of the sulky-frame and operated by a lever, E'. The ends of said rod are provided with elbows *e*, which act against the bars $d^3$, and through them raise and lower the shovels when the rod E is turned. $e^2$ are chains reaching from the shanks $d^2$ to the bar A, for the purpose of supporting the shovels when in use. F designates the plow-beam; G, the plow; G', the plow-standard. The plow-beam passes underneath the sulky-frame, and is hinged to the bar B by means of a clutch-plate and pin, *g*. The forward end of the beam, when raised, passes between two plates, *g'*, which, with the hinge *g*, prevent the lateral movement of said beam and help to keep it rigid when in use. A spring-catch, H, pivoted to one side of the tongue H', is used for the purpose of holding up the forward end of the beam when the plow is in use. A lever, *h*, attached to the tongue, or arranged in any other convenient position, and connected to the beam by means of a rod, *i*, or its equivalent, is used for the purpose of raising and holding the plow above the surface. The lever *h* is adapted to be locked in position when thrown forward. A loop, K, is attached to the rear end of the tongue to support the brace $K^1$ of the driver's seat, said brace having at its lower end a projection or nib, L, which enters said loop. A similar loop, $K^2$, is attached to the bar A, and used to support the seat when plowing. The seat is attached to the tongue when the implement is used for cultivating, in which case the tongue is shifted to the middle of the frame and bolted thereto, in the ordinary manner. M represents a spring, upon which the seat rests. When the plow is used the tongue is arranged so as to bring the plow in the line of draft.

It will be seen that the weight of the plow is supported, when the plow is in use, by the sulky frame or axle and the wheels. In this way the plow is kept from dragging or rubbing against the bottom of the furrow. The strain and friction are thereby considerably lessened and the usefulness of the plow greatly increased.

What I claim as my invention, and desire to secure by Letters Patent, is—

1. The combination, with a sulky having a rigid pole, of a plow-beam, F, rigidly attached to the sulky-frame by a catch, H, at the front end of the beam, and by a hinge, *g*, at about the center of curvature of the plow-casting, substantially as specified.

2. The beam F, hinged and held in position as described, in combination with the rod *i* and spring-catch H, the parts being arranged as shown and described.

3. The combination of the shaft E, having lever E, with the elbows *e*, arms $d^3$ D D′, and shanks $b^1$ $d^2$, substantially as specified.

4. The loops K $K^2$, in combination with a movable brace, $K^1$, having the plate L to fit either of said loops, substantially as specified.

In testimony that I claim the above I have hereunto subscribed my name in the presence of two witnesses.

WILLIAM G. CROSSLEY.

Witnesses:

JOSEPH P. BLACK,

E. M. FUNK.